United States Patent
Toyoda et al.

[11] Patent Number: 5,289,890
[45] Date of Patent: Mar. 1, 1994

[54] DRIVE UNIT FOR ELECTRIC MOTOR VEHICLE

[75] Inventors: Minoru Toyoda; Shuzo Moroto; Mutsumi Kawamoto, all of Nagoya, Japan

[73] Assignee: Aisin Aw Co., Ltd., Japan

[21] Appl. No.: 982,100

[22] Filed: Nov. 25, 1992

[30] Foreign Application Priority Data

Dec. 10, 1991 [JP] Japan .................. 3-325876

[51] Int. Cl.$^5$ .............................................. B60K 1/02
[52] U.S. Cl. .................... 180/65.8; 180/65.7; 318/139; 318/432
[58] Field of Search .............. 180/65.6, 65.7, 65.8, 180/364; 318/139, 432, 433, 434

[56] References Cited

U.S. PATENT DOCUMENTS

| | | | |
|---|---|---|---|
| 3,297,926 | 1/1967 | Campbell et al. | 180/65.8 X |
| 4,766,967 | 8/1988 | Slicker et al. | 180/65.8 X |
| 5,101,924 | 4/1992 | Yamagiwa et al. | 180/65.8 X |
| 5,166,584 | 11/1992 | Fukino et al. | 180/65.8 X |
| 5,172,784 | 12/1992 | Vorela, Jr. | 180/65.8 X |

FOREIGN PATENT DOCUMENTS

| | | | |
|---|---|---|---|
| 0004492 | 1/1986 | Japan | 318/433 |
| 0074004 | 3/1989 | Japan | 180/65.8 |

Primary Examiner—Brian L. Johnson
Attorney, Agent, or Firm—Lorusso & Loud

[57] ABSTRACT

A drive unit for an electric motor vehicle includes first and second electric motors having characteristics which achieve high efficiencies in different operational regions. A common motor shaft receives output torques from both of the first and second motors, which output torque are then transmitted to a drive wheel. Sensors are provided for sensing a travelling condition of the vehicle and the rotational speeds of the first and second motors. Request torque, i.e. that torque required for the travel of the vehicle, is determined in accordance with the detected travelling condition of the vehicle. The determined request torque is distributed to the first and second motors in accordance with the detected rotational speeds to govern the output torques of the first and second motors.

6 Claims, 11 Drawing Sheets

| R / T | 1 | | 10 | | 20 | | 30 | | 40 | | 50 | |
|---|---|---|---|---|---|---|---|---|---|---|---|---|
| | $T_1$ | $T_Z$ | $T_1$ | $T_Z$ | $T_1$ | $T_Z$ | $T_1$ | $T_Z$ | $T_1$ | $T_Z$ | $T_1$ | $T_Z$ |
| 1 | 1 | 0 | 1 | 0 | 1 | 0 | 1 | 0 | 1 | 0 | 1 | 0 |
| 2 | 2 | 0 | 2 | 0 | 2 | 0 | 2 | 0 | 2 | 0 | 2 | 0 |
| 3 | 3 | 0 | 3 | 0 | 3 | 0 | 3 | 0 | 3 | 0 | 3 | 0 |
| 4 | 4 | 0 | 4 | 0 | 4 | 0 | 4 | 0 | 4 | 0 | 4 | 0 |
| 5 | 3 | 2 | 3 | 2 | 3 | 2 | 3 | 2 | 3 | 2 | 3 | 2 |
| 6 | 3 | 3 | 3 | 3 | 3 | 3 | 3 | 3 | 4 | 2 | 4 | 2 |
| 7 | 4 | 3 | 4 | 3 | 4 | 3 | 4 | 3 | 4 | 3 | 4 | 3 |

DRIVE UNIT FOR ELECTRIC MOTOR VEHICLE

BACKGROUND OF THE INVENTION

1. Field of the Invention

The present invention relates to a drive unit for an electric motor vehicle.

2. Description of the Background Art

In a conventional vehicle, a gasoline engine is generally used to generate a torque, which is transmitted to drive wheels after a change in rotational speed by an automatic transmission or a manual transmission. In the gasoline engine, a mixture of gasoline and air is compressed and combusted to generate energy which is output as torque. Therefore, noise is caused by the combustion, and the exhaust gas which is the product of combustion pollutes the environment.

Therefore, it has been proposed to replace combustion engines with electric motors to prevent generation of the noise and exhaust gas. Electric vehicles are equipped with an electric motor and a battery, and the motor rotates drive wheels. With an electric vehicle there is scarcely any noise and exhaust gas is not generated.

FIG. 15 is a cross section of a prior art drive unit for an electric vehicle.

In FIG. 15, 10 is a drive unit, 11 is a motor, and 12 is a differential unit. The motor 11 is formed of a stator 14 fixed to a drive unit casing 13 and a rotor 15 disposed around the stator 14. A direct current is supplied to a coil 16 of the stator 14 to rotate the rotor 15.

The differential unit 12 has a casing 18 integral with the rotor 15, and the rotation of the rotor 15 is transmitted to the casing 18. The casing 18 carries a pinion shaft 19, which extends through the casing 18 and rotatably carries a plurality of pinion gears 20. The pinion gears 20 engage with left and right side gears 21 and 22, through which the rotation is transmitted to left and right drive shafts 23 and 24, respectively.

In the conventional electric vehicle described above, however, the quantity of electricity which can be stored in the battery is restricted, and thus the travelling distance of the vehicle is short. In the travel of a vehicle equipped with an electric motor, the efficiency changes in accordance with the rotational speed, i.e., the vehicle speed. Therefore, a high drive efficiency may be achieved in a high-speed range, in which case the efficiency is low in the low speed range. Conversely, a high drive efficiency may be achieved in a low-speed range, in which case the efficiency is low in the high speed range.

As noted above, a high efficiency throughout the entire speed range cannot be achieved. Further, in high-speed driving, the travelling distance is significantly reduced, and rapid start and rapid acceleration cannot be achieved.

Therefore, there exists a need for an electric vehicle which can achieve high efficiency throughout the entire speed range FIG. 16 schematically shows another prior art drive unit for an electric vehicle, FIG. 17 is a cross-section of the same prior art unit, and FIG. 18 is a schematic diagram of same.

In FIG. 16, 29 indicates the electric vehicle, 30 is a drive unit for the electric vehicle 29, 31 is an AC motor, 32 is a battery for supplying the current to the motor 31, and 33 is a transistor inverter for converting the DC current supplied from the battery 32 into AC current. The transistor inverter 33 operates in response to a signal from a control unit 34 to generate the AC current.

A change speed lever or shift lever 35, which is disposed near a driver's seat, is operated to set the transmission at an intended speed range as described later. An accelerator 36 is disposed near the driver's seat and is operated to change the rotational speed of the motor 31 and thereby change the speed of the vehicle.

A rotor phase angle sensor 37 sends an output signal to the control unit 34. Various transmission ranges are selected for transmission 38 responsive to movement of the shift lever 35 to change the rotational speed of the motor 31 at a gear ratio complying with the travelling conditions.

In FIGS. 17 and 18, 30 is a drive unit, 31 is the motor and 38 is the transmission. The motor 31 is formed of a rotor 41 and stators 42 and 43 disposed at opposite sides of the rotor 41. The rotor 41 rotates together with a rotor shaft 44 which is rigidly connected to the rotor 41.

The rotor shaft 44 is connected to an input shaft 45 of the transmission 38, and thus the rotation of the motor 31 is supplied to an input shaft 45. 47 indicates an electromagnetic clutch, 48 is a first reduction gear, and 49 is a second reduction gear. A main shaft 50, which is disposed in parallel with the input shaft 45, carries an one-way clutch 51 and a reverse gear clutch 52. A differential gear 55 transmits the rotation, at a speed reduced by a final drive gear 53, to the left and right drive shafts 56 and 57.

In the electric vehicle 29 described above, the rotation of the motor 31 is transmitted to the transmission 38, which can select the necessary speed range, so that the appropriate speed ranges can be achieved for the respective operational regions of the motor 31, and thus relatively high drive efficiency can be achieved throughout the entire range of the vehicle speed. However, the torque generated by the motor 31 is transmitted through the transmission 38 to the drive wheels. Therefore, there is a loss related to the transmission efficiency of the transmission 38, and thus the overall efficiency is insufficient and, also, a complicated speed change mechanism is required.

SUMMARY OF THE INVENTION

Accordingly, it is an object of the invention to provide a drive unit for an electric motor vehicle, overcoming the above-noted disadvantages, which can efficiently operate over the entire range of vehicle speeds, increase the travel distance during both high-speed driving and low-speed driving, and enable rapid start and rapid acceleration.

Accordingly, the drive unit for an electric motor vehicle of the present invention includes first and second electric motors having characteristics which achieve high efficiencies in different operational regions, respectively. Output torques of the first and second motors are supplied through a common motor shaft to a drive wheel.

There are also provided a sensor for detecting an operating parameter of the vehicle, and means for sensing the rotation speeds of the first and second motors.

The drive unit further includes a torque request determining means for determining the requested torque required for the travel of the vehicle in accordance with a travelling condition of the vehicle, and output torque distribution determining means for distributing the requested torque, which is determined by the torque request determining means, to the first and second motors in accordance with their rotational speeds, thereby determining the output torques of the first and second motors.

The present invention provides first and second motors which differ in that they provide maximum efficiency in different operational regions, respectively, as described above, and the output torques of the first and second motors are supplied through a common motor shaft to the drive wheels.

Since the output torque of the first and second motors can be large, drivability can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will be described hereinafter with reference to the drawings.

Figure 1:
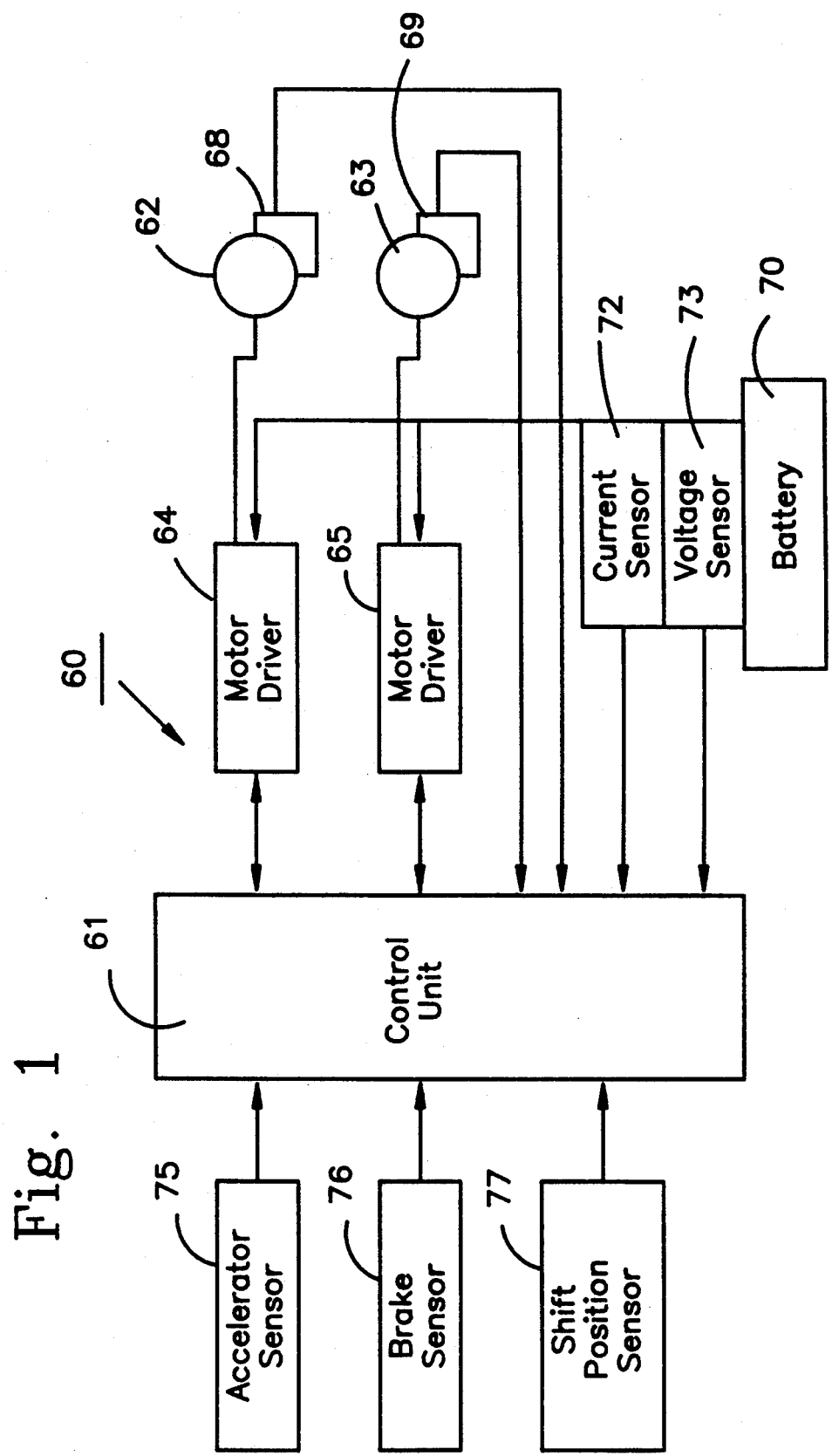
FIG. 1 is a schematic diagram of a drive unit for an electric motor vehicle of the invention.

In FIG. 1, 60 indicates a drive unit for an electric motor vehicle, 61 indicates a control unit including a CPU, RAM and ROM. 62 and 63 indicate first and second motors which are independently controlled by motor drivers 64 and 65, respectively. The first and second motors 62 and 63 are provided with temperature sensors 68 and 69, respectively, which sense temperatures and supply sensed values to the control unit 61.

The first and second motors 62 and 63 receive DC currents from a common battery 70. The motor drivers 64 and 65 supply the DC currents received from the battery 70 to the first and second motors 62 and 63, in accordance with a signal received from the control unit 61, to drive the motors 62 and 63, respectively.

The illustrated first and second motors 62 and 63 are DC motors, but AC motors may be used provided that the motor drivers 64 and 65 include means for converting the DC currents into AC currents.

The first and second motors 62 and 63 achieve high efficiencies in different operation regions. Specifically, the first motor 62 provides high torque efficiency in a high-speed region, i.e., at high rotational speed, and the second motor 63 provides high torque efficiency in a low-speed region, i.e., at low rotational speed. A request torque is arithmetically determined on the basis of travelling conditions of the vehicle, and the request torque is distributed to the first and second motors 62 and 63.

A current sensor 72 and a voltage sensor 73 are interposed between the battery 70 and the motor drivers 64 and 65. The current sensor 72 senses the current supplied to and from the battery 70, and the voltage sensor 73 senses the voltage of the battery 70. Thus, the state of the battery 70 can be monitored by the sensors 72 and 73. The motor drivers 64 and 65 are adapted to sense the rotational speeds of the first and second motors 62 and 63, respectively, and the vehicle speed can be arithmetically obtained from those rotational speeds of the motors 62 and 63.

The control unit 61 receives inputs from an accelerator sensor 75, a brake sensor 76 and a shift position sensor 77, so that the first and second motors 62 and 63 may be driven in accordance with commands by the driver. The accelerator sensor 75 is in the form of a position sensor (e.g., variable resistor) which detects the degree of depression of an accelerator pedal by the driver, i.e. the commanded torque. The brake sensor 76 is in the form of a position sensor which detects degree of depression of a brake pedal by the driver for reducing the vehicle speed, or in the form of a hydraulic sensor associated with a hydraulic brake. The shift position sensor 77 is a switch which detects operation of the shift lever, and senses forward, reverse and neutral positions.

From the control unit 61, the motor drivers 64 and 65 receive rotation direction instructing signals, which instruct directions of rotation of the first and second motors 62 and 63, output torque instructing signals, which instruct the output torques of the first and second motors 62 and 63, and drive/regeneration instructing signals, which dictate either a drive mode or a regeneration mode for the first and second motors 62 and 63.

Vehicles equipped with the above-described drive unit 60 will now be described wherein the drive unit 60 for the electric motor vehicle described above uses the first and second motors 62 and 63 as drive sources. In the description which follows the acronyms "FF" and "FR" refer to "front-engine/front-wheel-drive" and "front-engine/rear-wheel-drive", respectively. Likewise, a front-motor/front-wheel-drive type vehicle will be referred to as a vehicle of the FF type, and a front-motor/rear-wheel-drive vehicle will be referred to as a vehicle of the FR type.

Figure 2:
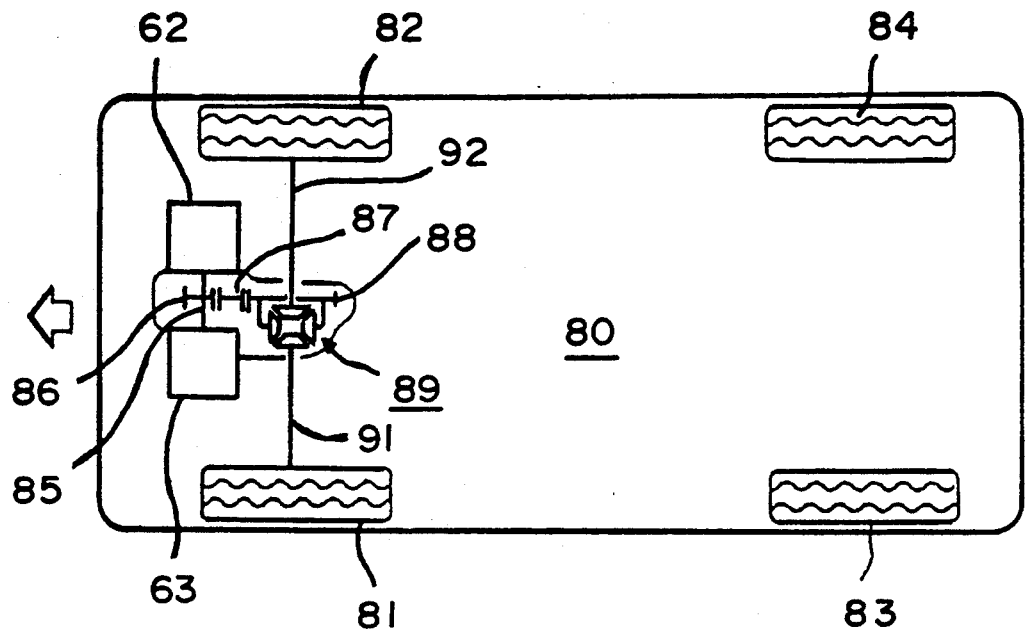
FIG. 2 is a schematic diagram of a FF vehicle equipped with a drive unit for an electric motor vehicle in accordance with the present invention.
Figure 3:
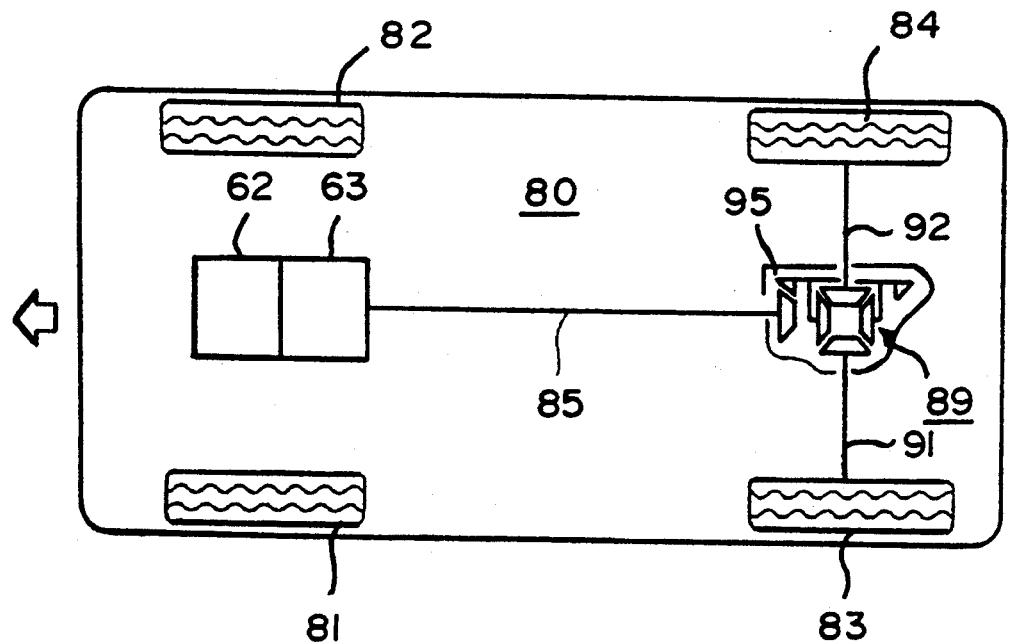
FIG. 3 is a schematic diagram for a FR type vehicle equipped with a drive unit for an electric motor vehicle in accordance with the present invention.

FIG. 2 shows an embodiment in which the drive train for an electric motor vehicle of the invention is applied to a vehicle of the FF type, and FIG. 3 shows an embodiment in which a drive train for an electric motor vehicle of the invention is applied to a vehicle of the FR type.

In FIG. 2, first and second motors 62 and 63 are disposed in parallel with each other in a forward portion of a vehicle 80. 81 and 82 indicate front wheels which are driven by the first and second motors 62 and 63, respectively, and 83 and 84 indicate rear wheels.

Thus, the first and second motors 62 and 63 drive a common motor shaft 85, which rotates a counter drive gear 86. The counter drive gear 86 engages a counter driven gear 87, which, in turn, engages a ring gear 88, so that rotation in the same direction as that of the motor shaft 85 is transmitted at a reduced rotational speed to the ring gear 88.

The ring gear 88 is coupled to a differential unit 89, through which the rotation of the ring gear 88 is transmitted to left and right drive shafts 91 and 92, driving the front wheels 81 and 82.

In FIG. 3, the first and second motors 62 and 63 are disposed in series with each other in a forward portion of the vehicle 80. 81 and 82 indicate the front wheels, and 83 and 84 indicate the rear wheels which are driven by the first and second motors 62 and 63.

Thus, the first and second motors 62 and 63 are connected to and rotate the common motor shaft 85 extending toward the rear wheels 83 and 84, and the motor shaft 85 rotates the differential unit 89 through bevel gears 95. The rotation of the differential unit 89 is transmitted to the left and right drive shafts 91 and 92, which drive the rear wheels 83 and 84.

Figure 4:
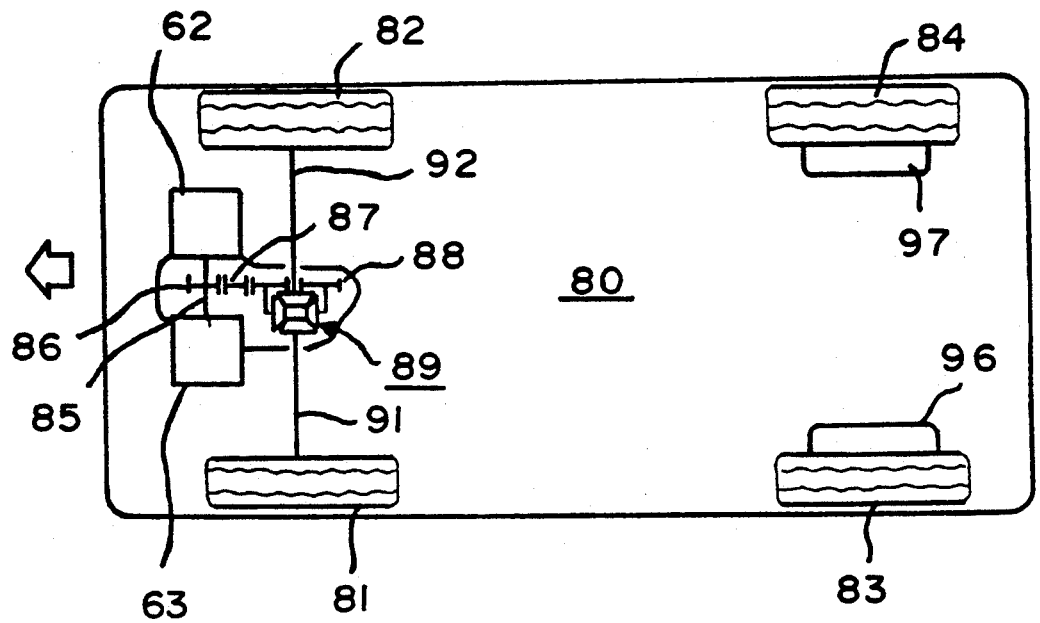
FIG. 4 is a schematic diagram of a four-wheel-drive type vehicle employing a drive unit for an electric motor vehicle of the present invention together with wheel motors.

FIG. 4 shows the drive unit or drive train 60 of the present invention installed in a four-wheel-drive type vehicle. This embodiment includes individual wheel motors 62, 63, 96 and 97 which allow the request torque to be distributed to the respective wheels in a manner maximizing driving efficiency.

First and second motors 62 and 63 are disposed in the forward portion of the vehicle 80 to drive the front wheels 81 and 82, respectively, and wheel motors 96 and 97 are mounted in the rear of the vehicle 80 to drive wheels 83 and 84, respectively.

Thus, the first and second motors 62 and 63 drive the common motor shaft 85, which, in turn, rotates the counter drive gear 86. The counter drive gear 86 is engaged with the counter driven gear 87, which, in turn, engages with the ring gear 88, so that rotation in the same direction as that of the motor shaft 85 is transmitted at a reduced rotational speed to the ring gear 88.

The ring gear 88 is coupled to the differential unit 89, through which the rotation of the ring gear 88 is transmitted to the left and right drive shafts 91 and 92 driving the front wheels 81 and 82.

Figure 5:
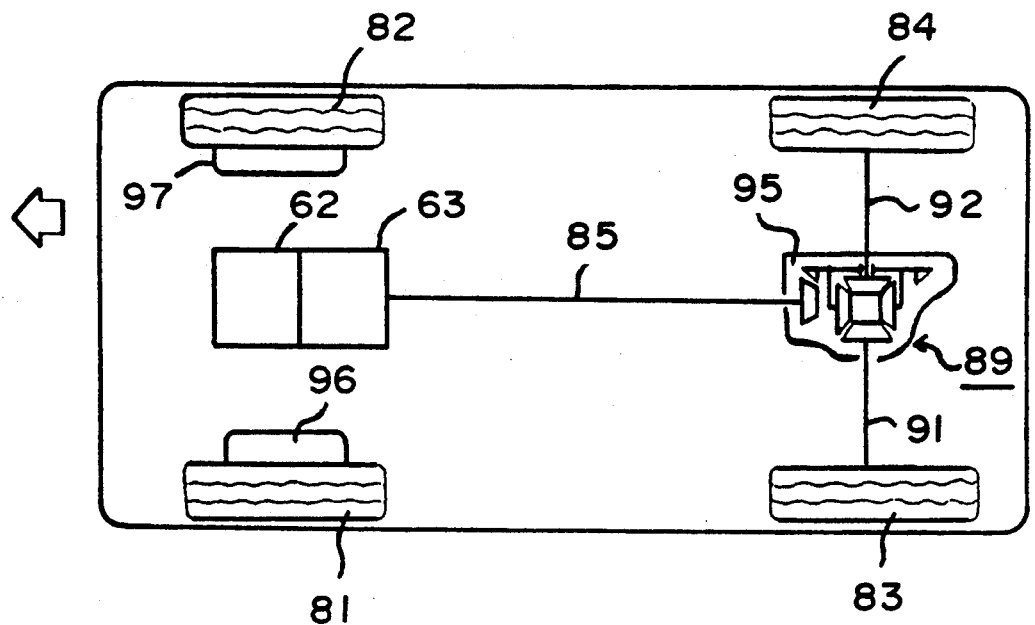
FIG. 5 is a schematic diagram of a second embodiment of a four-wheel-drive type vehicle employing a drive unit for an electric motor vehicle of the present invention together with wheel motors.

FIG. 5 shows first and second motors 62 and 63 which are disposed in the forward portion of the vehicle 80 and which, respectively, drive rear wheels 83 and 84. Front wheels 81 and 82 are driven by the wheel motors 96 and 97, respectively.

Thus, the first and second motors 62 and 63 are connected to the common motor shaft 85 extending toward the rear wheels 83 and 84, and rotate the motor shaft 85, which, in turn, rotates the differential unit 89 through the bevel gears 95. The rotation of the differential unit 89 is transmitted to the left and right drive shafts 91 and 92, which drive the rear wheels 83 and 84.

Individual components of the drive unit 60 of the invention will now be described below.

Figure 6:
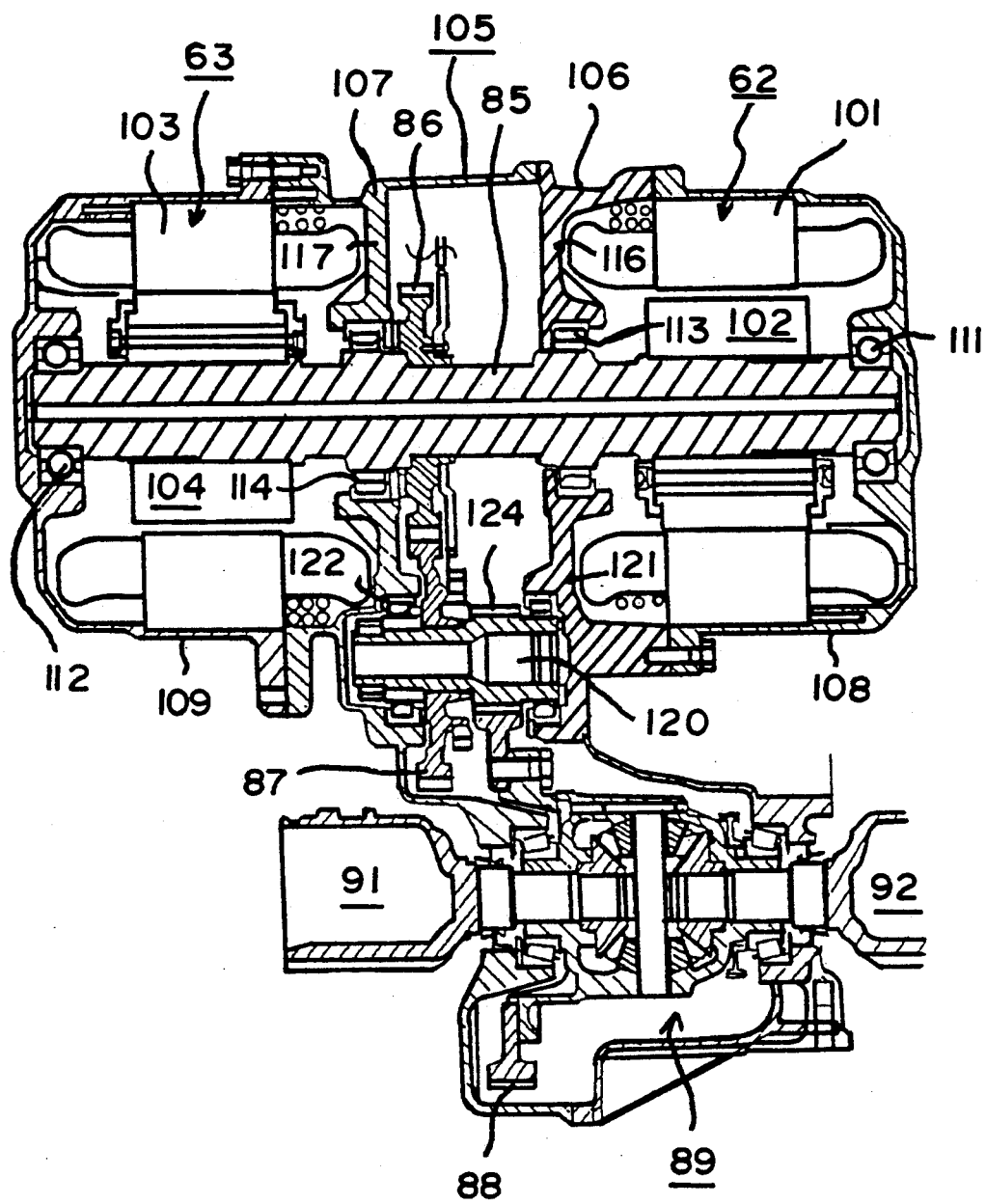
FIG. 6 is a cross section of a drive unit for an electric motor vehicle in accordance with the present invention.

FIG. 6 shows first motor 62 as including a stator 101 and a rotor 102. Likewise, a second motor 63 includes a stator 103 and a rotor 104. The rotors 102 and 104 are fixed to the motor shaft 85, so that, during the operation of the first and second motors 62 and 63, the output torques which are distributed in a predetermined distribution ratio are transmitted through the rotors 102 and 104 to the motor shaft 85.

The drive unit 60 for the electric motor vehicle is mounted in a drive unit casing 105 of a split structure, which has a front casing 106 and a rear casing 107. Front and rear covers 108 and 109 are respectively fixed to the front and rear casings 106 and 107 by bolts. The stator 101 is fixed to the front cover 108, and the stator 103 is fixed to the rear cover 109.

The motor shaft 85 is rotatably supported at its ends by the front and rear covers 108 and 109 through bearings 111 and 112, and is also rotatably supported in its middle through bearings 113 and 114 by center pieces 116 and 117 located at front and rear sides, respectively.

An intermediate transmission shaft 120 is disposed parallel to the motor shaft 85, and is rotatably supported at its ends by the center pieces 116 and 117 at the front and rear sides through bearings 121 and 122. The counter drive gear 86 is fixed to the first and second motors 62 and 63, and the counter driven gear 87 is fixed to the intermediate shaft 120. The output torques generated by the first and second motors 62 and 63 are transmitted through the motor shaft 85 to the intermediate transmission shaft 120.

An output gear 124 (which is not shown in FIG. 2 for the sake of simplicity) adjacent to the counter driven gear 87 is fixed to the intermediate transmission shaft 120. The ring gear 88 disposed at the outer periphery of the differential unit 89 engages the output gear 124.

The output gear 124 has teeth smaller in number than the number of the teeth of the ring gear 88. The output gear 124 and the ring gear 88, therefore, form a final reduction unit. The final reduction unit reduces the speed of rotation to be transmitted to the ring gear 88. The rotation of the ring gear 88 is transmitted to and differentiated by the differential unit 89, and then is transmitted to the left and right drive shafts 91 and 92.

Control for the drive unit described above will now be described below.

Figure 7:
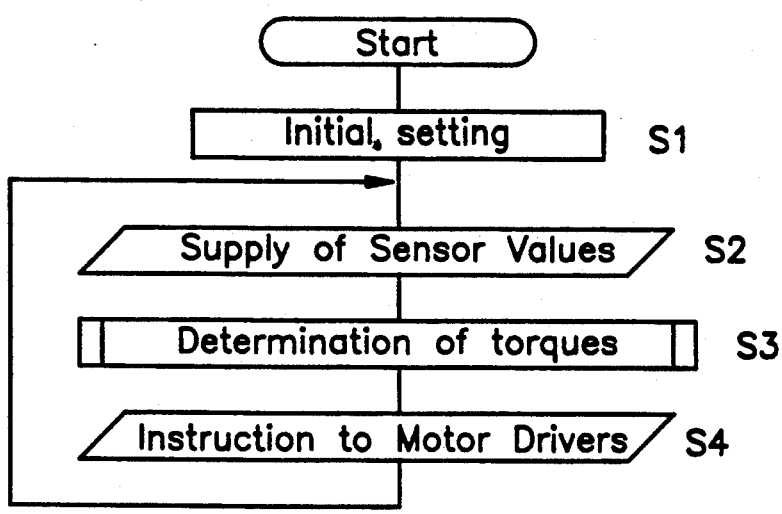
FIG. 7 is a flow chart showing operations of a drive unit for an electric motor vehicle of the present invention.

FIG. 7 shows the sequence of steps for control of the drive unit in which:

Step S1 is an initial setting such as setting of contents of the RAM carried out in the control unit 61;

Step S2 inputs sensed values of the temperature sensors 68 and 69, current sensor 72, voltage sensor 73, accelerator sensor 75, brake sensor 76 and shift position sensor 77, along with the rotational speeds of the first and second motors 62 and 63 sensed by the motor drivers 64 and 65;

Step S3 is the torque determination; and

Step S4 instructs the motor drivers 64 and 65, based on the result of the torque determination.

Figure 8:
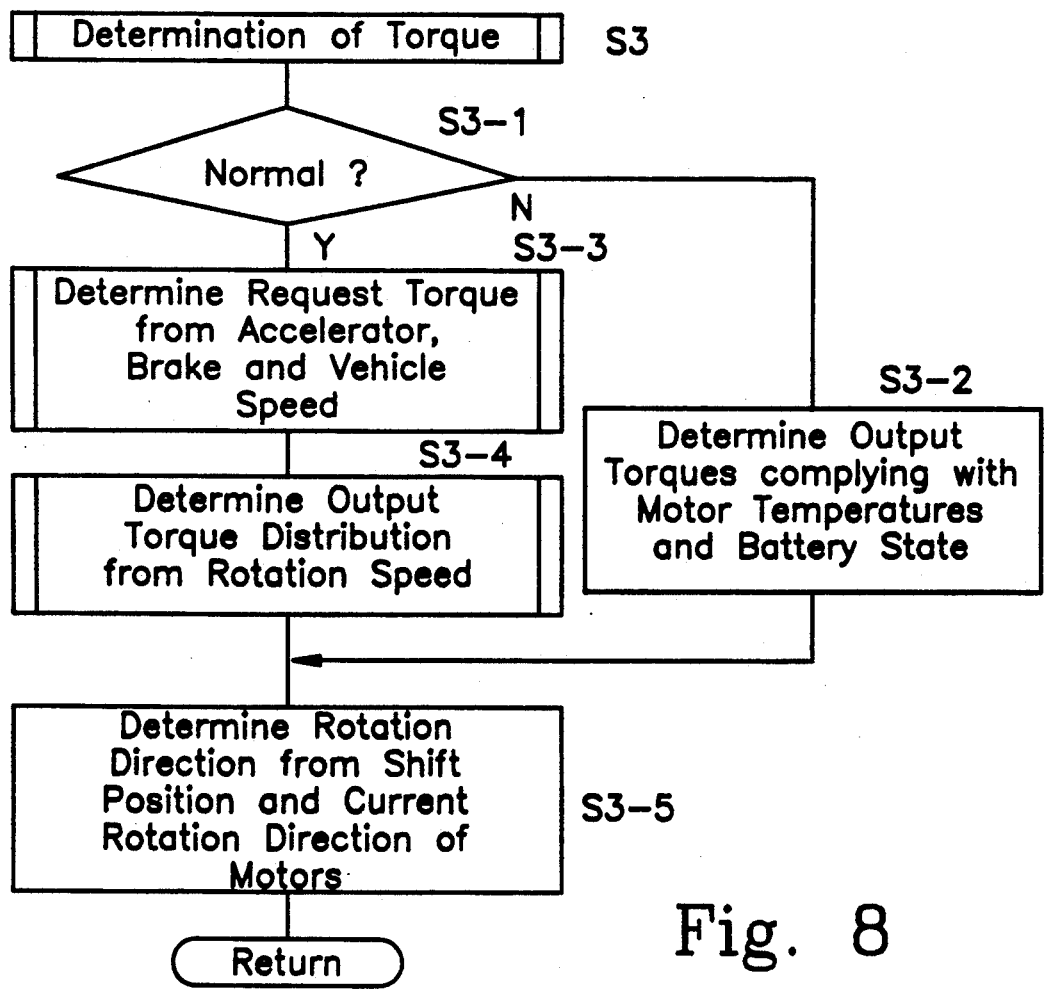
FIG. 8 is a flow chart showing a torque determining process in the present invention.

The torque determination of step S3 is detailed in FIG. 8.

Step S3-1 determines whether or not the motor temperatures sensed by the temperature sensors 68 and 69 as well as the state of the battery sensed by the current sensor 72 and the voltage sensor 73 are normal. If normal, the process advances to step S3-3. If abnormal, the process advances to step S3-2.

Step S3-2 determines output torques in accordance with the motor temperatures and the state of the battery, and the process advances to step S3-5.

Step S3-3 determines a request torque T based on the sensed values received from the accelerator sensor 75 and brake sensor 76 as well as the rotational speeds of the first and second motors 62 and 63 sensed by the motor drivers 64 and 65.

Figure 9:
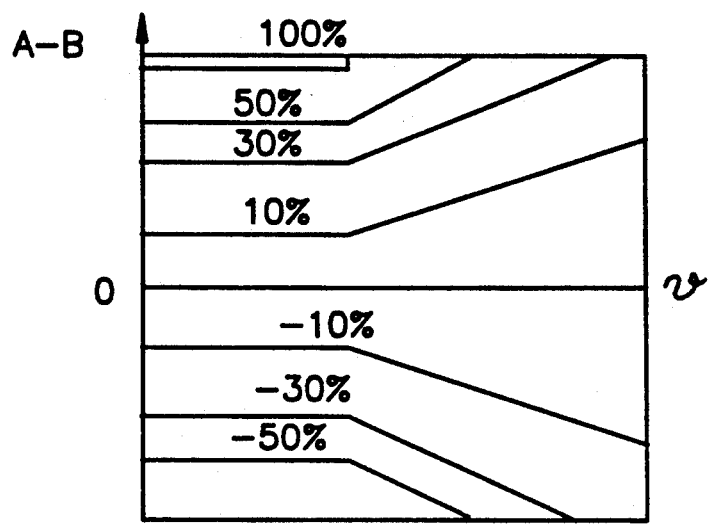
FIG. 9 is a graph which may be used in the present invention as a map for determining a request torque.

The percentage of the request torque with respect to maximum output torque $T_{max}$ which can be supplied by the first and second motors 62 and 63 is determined by reference to a request torque determining map such as that shown in FIG. 9. In FIG. 9 the abscissa represents vehicle speed v obtained by arithmetic operation based on the rotational speeds of the first and second motors 62 and 63, and the ordinate indicates the difference (A-B) between the sensed value A of the accelerator sensor 75 and the sensed value B of the brake sensor 76. The percentage of the request torque with respect to the maximum output torque $T_{max}$ can be determined by plotting the vehicle speed v against the difference (A-B). The request torque T may be arithmetically obtained by an appropriate arithmetic formula, without utilizing the request torque determining map. Several methods for determining the request torque may be provided in advance, so that a driver can appropriately select, e.g. by operation of a manual switch, the method for improving the efficiencies of the first and second motors 62 and 63 and for increasing the output torques.

Step S3-4 determines proper distribution of the output torques of the first and second motors 62 and 63 based on the rotational speeds of the first and second motors 62 and 63.

In step S3-5 rotation direction is determined, based on the shift position sensed by the shift position sensor 77 and the current rotation direction of the first and second motors 62 and 63.

The foregoing operations are repeated.

Figure 10:
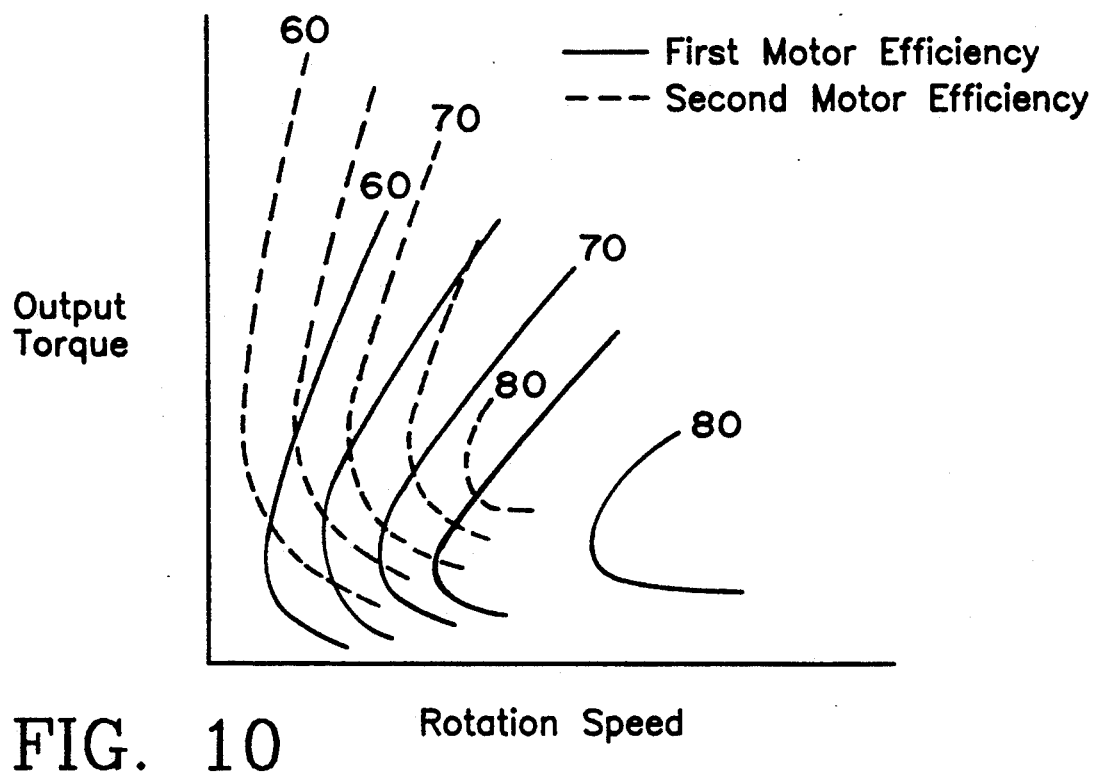
FIG. 10 is a graph which may be utilized in the present invention as an efficiency map.
Figure 11:
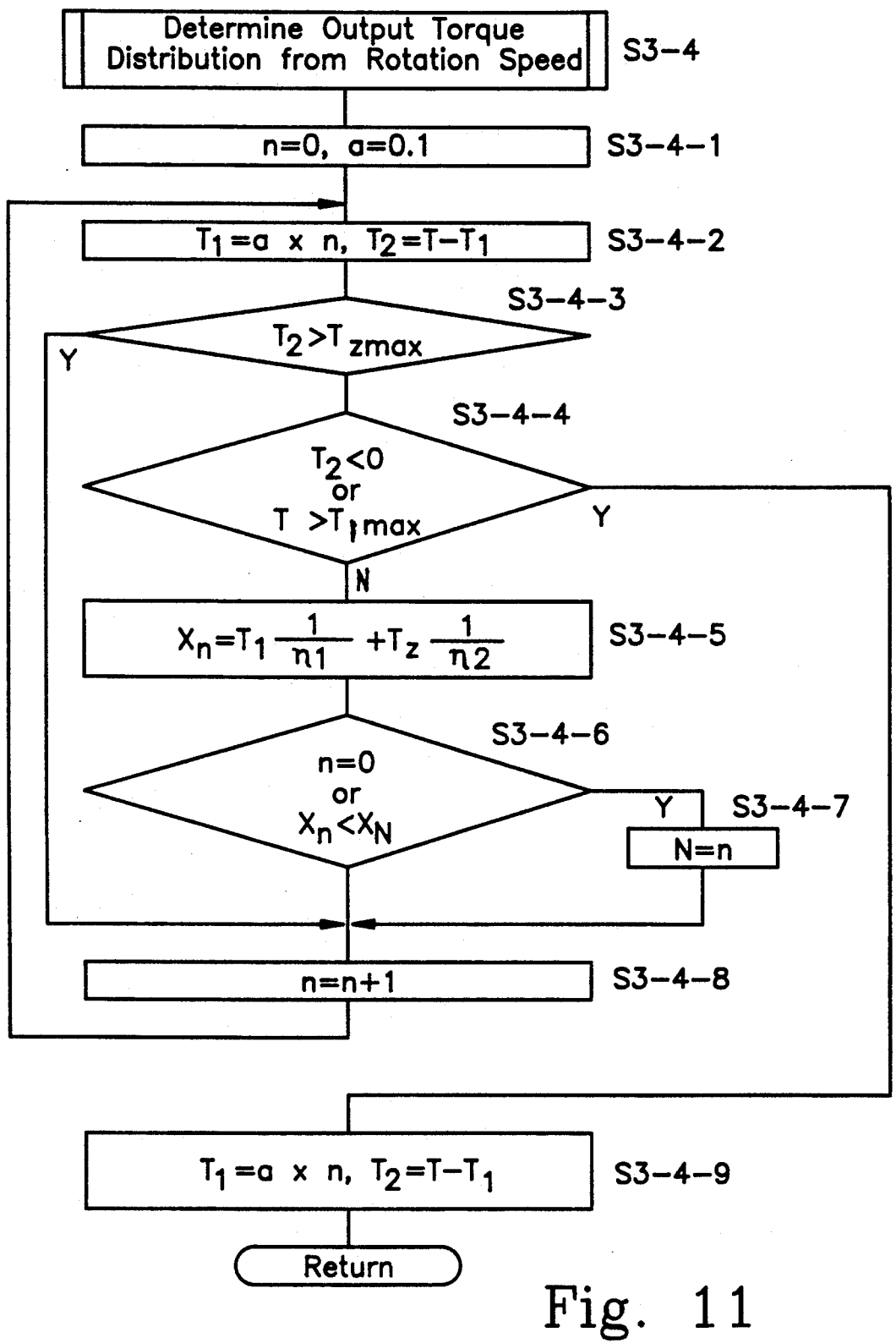
FIG. 11 is a flow chart showing an output torque distribution determining process in accordance with the present invention.

The process for determining the distribution of the output torques in step S3-4 is illustrated by the flow chart of FIG. 11 and utilizes the efficiency map of FIG. 10.

In step S3-4-1, the initial setting for calculation is executed, with an arithmetic count n set at 0 and the minimum unit a of the torque instruction set at 0.1.

In step S3-4-2, the distribution of the output torque $T_1$ to the first motor 62 and the output torque $T_2$ to the second motor 63 with respect to the request torque T is determined as follows:

$$T_1 = a \times n$$

$$T_2 = T - T_1$$

In step S3-4-3, a determination is made as to whether or not the output torque $T_2$ is larger than the maximum output torque $T_{2max}$ of the second motor 63. If the output torque $T_2$ is larger than the maximum output torque $T_{2max}$, the output torque $T_2$ cannot be realized, so the process advances to step S3-4-8. If the output torque $T_2$ is not larger than the maximum output torque $T_{2max}$, the process advances to a step S3-4-4.

In step S3-4-4, a determination is made as to whether or not the output torque $T_2$ is smaller than 0, and whether or not the output torque $T_1$ is larger than the maximum output torque $T_{1max}$ of the first motor 62. If not, the process advances to a step S3-4-5, and otherwise, the process advances to a step S3-4-9 because further distribution is impossible.

Step S3-4-5 calculates $X_n$ wherein n is the count value, as a value proportional to quantities of energy which are supplied to the first and second motors 62 and 63 for generating the output torques $T_1$ and $T_2$.

$$X_2 = T_1/\eta_1 + T_2/\eta_2$$

$\eta_1$: efficiency of the first motor 62 when the output torque $T_1$ is generated at the current rotational speed.

$\eta_2$: efficiency of the second motor 63 when the output torque $T_2$ is generated at the current rotational speed.

The above efficiencies $\eta_1$ and $\eta_2$ and can be obtained by reference to the efficiency map, from the current rotational speeds of the first and second motors 62 and 63 and the currently supplied output torques $T_1$ and $T_2$. The above value $X_n$ is obtained by the arithmetic operation based on the efficiencies $\eta_1$ and $\eta_2$.

In FIG. 10, the abscissa represents the rotational speeds of the first and second motors 62 and 63 and the ordinate indicates the output torques $T_1$ and $T_2$. The solid lines represent the efficiency $\eta_1$ of the first motor 62, and dashed lines represent the efficiency $\eta_2$ of the second motor 63. Numbers on the lines represent efficiencies $\eta_1$ and $\eta_2$ by percentage.

In step S3-4-6, a determination is made as to whether the count value n is 0 and whether or not the value $X_n$ is lower than $X_N$ (where $X_N$ is the minimum value of the values $X_n$ already operated, and N is the count value n corresponding to the minimum value). In the case of n=0, i.e., the initial stage of this process, or when $X_n < X_N$ the process advances to a step S3-4-7 but otherwise, the process advances to a step S3-4-8.

In step S3-4-7, N is set at the count value n, and the minimum value $X_N$ of the values $X_n$ is renewed.

In step S3-4-8, 1 is added to the count value n, and the arithmetic operations starting with the step S3-4-2 are repeated.

Step S3-4-9 request torques for achieving the highest efficiency are substituted for the output torques $T_1$ and $T_2$, respectively.

$$T_1 = a \times N$$

$$T_2 = T - T_1$$

In this manner, the value $X_n$ is arithmetically determined from the output torque $T_1$ distributed to the first motor 62, the output torque $T_2$ distributed to the second motor 63, the efficiency $\eta_1$ of the first motor and the efficiency $\eta_2$ of the second motor. Target output torques $T_1$ and $T_2$ minimizing the value $X_n$ can thereby be determined. Then, the request torque T is distributed in accordance with the determined target output torques $T_1$ and $T_2$, whereby the drive unit 60 for the electric motor vehicle can operate at maximum overall efficiency because the value is proportional to the required quantity of energy.

The output torques $T_1$ and $T_2$, distributed to the first and second motors 62 and 63 may be obtained, instead of by the foregoing arithmetic operation, by use of a map for determining the distribution of the output torques in a manner described below with reference to FIGS. 12 and 13.

Figures 12, 13:
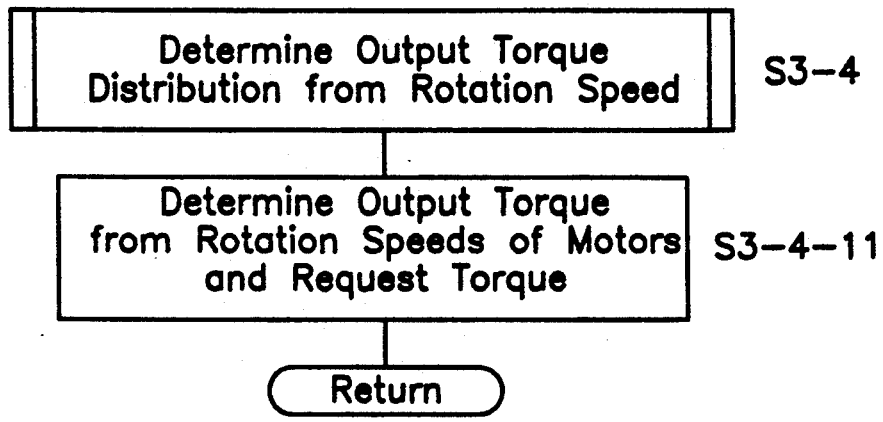
FIG. 12 is a flow chart showing another example of an output torque distribution determining process in accordance with the present invention.
FIG. 13 is a chart which may be used in the present invention of an output torque distribution determining map.

In step S3-4-11, the rotational speeds R of the first and second motors 62 and 63 and the request torque T are utilized to read the output torques $T_1$ and $T_2$ from the map of FIG. 13 to determine the distribution of the output torques. In this case, the map for determining the distribution of the output torques contains the output torques $T_1$ and $T_2$ corresponding to the various rotational speeds R and request torques T.

Figure 14:
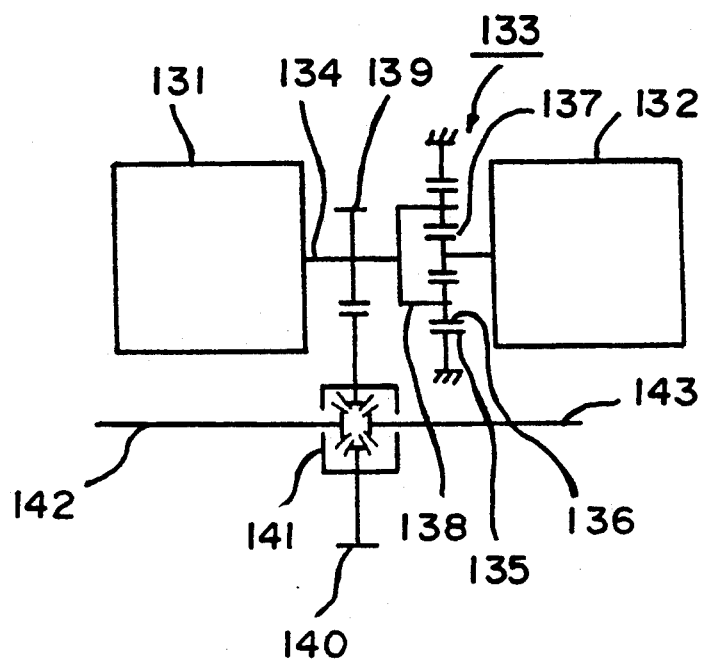
FIG. 14 is a schematic diagram of an embodiment of the present invention in which motors having the same characteristics are used in a drive unit for an electric motor vehicle.
Figure 15:
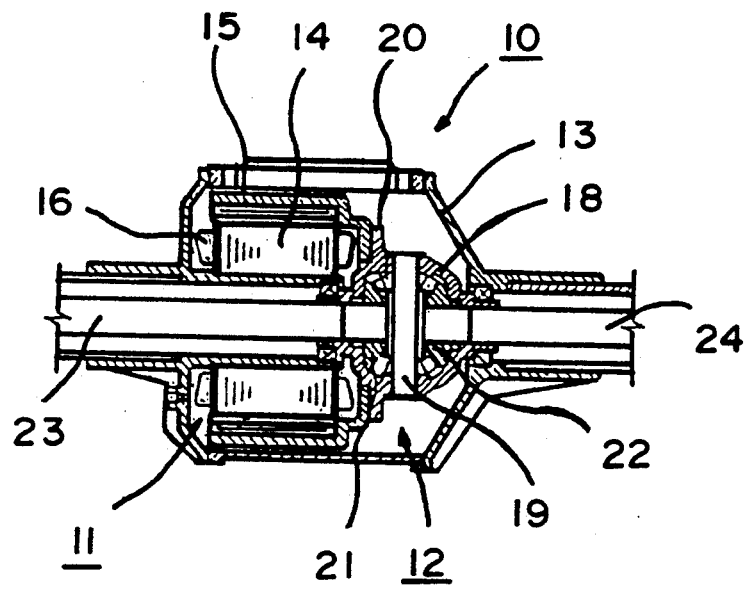
FIG. 15 is a cross section of a prior art drive unit for an electric vehicle.
Figure 16:
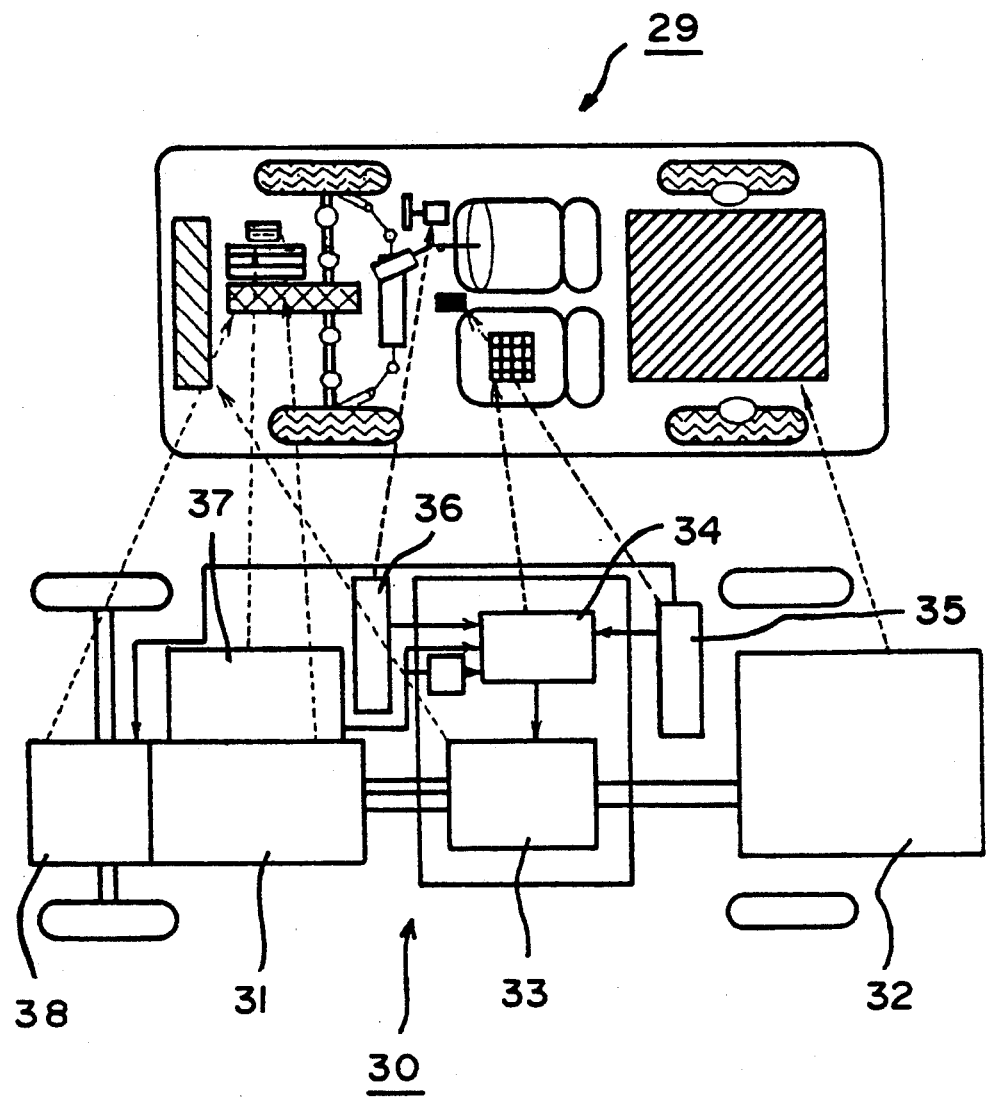
FIG. 16 is a cross section of another prior art drive unit for an electric vehicle.
Figure 17:
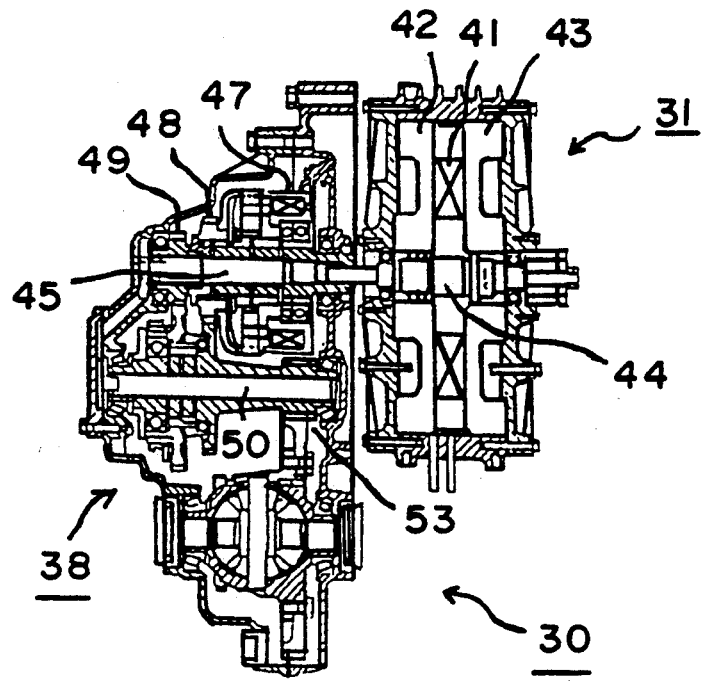
FIG. 17 is a cross section of yet another prior art drive unit for an electric vehicle.
Figure 18:
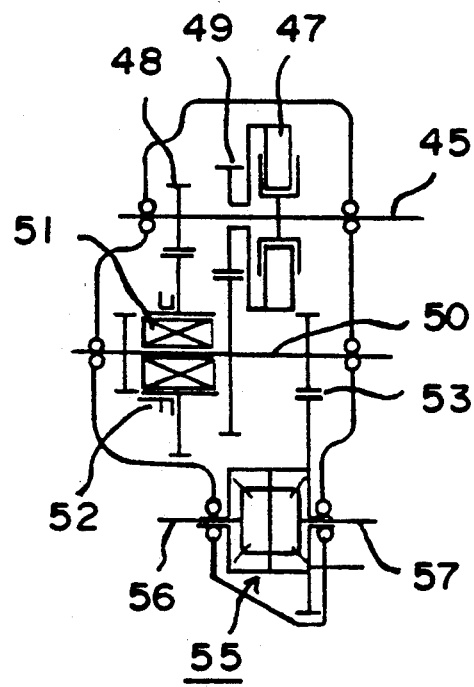
FIG. 18 is a schematic diagram showing still another prior art drive unit for an electric vehicle.

FIG. 14 shows an embodiment in which motors having the same characteristics are used in the drive unit for the electric motor vehicle.

Referring now to FIG. 14, 131 indicates a first motor and 132 indicates a second motor. The first and second motors 131 and 132 have the same relationship between the rotational speed and the efficiency. The first motor 131 is directly connected to a motor shaft 134, and the second motor 132 is indirectly connected to the motor shaft 134 through a planetary gear unit 133. The planetary gear unit 133 is formed of a ring gear 135, a pinion gear 136 and a sun gear 137. The ring gear 135 is fixed and the pinion gear 136 is coupled to the motor shaft 134 through a carrier 138. The sun gear 137 is coupled to the second motor 132. An output gear 139 is fixed to the motor shaft 134 and is engaged with a ring gear 140. The ring gear 140 is fixed to a differential unit 141, through which the driving force is transmitted to left and right drive wheels 142 and 143. In this case, the first and second motors 131 and 132 having the same characteristics may be used at the same efficiency, whereby the output torques distributed to the first and second motors 131 and 132 can be controlled.

Although the present invention has been described and illustrated in detail, it should be understood that the same is by way of illustration and example only and is not intended to be limiting; rather, any embodiment consistent with the spirit of the present invention is intended to be included within the scope of the appended claims.

We claim:

1. A drive unit for an electric motor vehicle comprising:
    a first electric motor having maximum torque output efficiency within a first range of rotational speeds;
    a second electric motor having maximum torque output efficiency in a second range of rotational speeds different from said first range;
    a single motor shaft receiving the torque outputs of both of said first and second electric motors;
    means for transmitting said output torques from said motor shaft to at least one drive wheel;
    first sensing means for sensing at least one travelling condition of said vehicle and for generating a travelling condition signal;
    second sensing means for sensing rotational speeds of said first and second motors and for generating rotational speed signals;
    request torque determining means for determining a request torque required for travel of the vehicle in accordance with said signals from said first and second sensing means; and
    output torque distribution determining means for distributing said request torque to said first and second motors in accordance with said rotational speed signals to control the output torques of said first and second motors.

2. A drive unit for an electric motor vehicle according to claim 1, wherein said means for transmitting said output torques comprises a differential unit.

3. A drive unit for an electric motor vehicle according to claim 2, wherein said means for transmitting said output torques further comprises a counter shaft disposed between said differential unit and said motor shaft.

4. A drive unit for an electric motor vehicle according to claim 1, wherein said first sensing means comprises an accelerator sensor and a brake sensor.

5. A drive unit for an electric motor vehicle comprising:
    a first motor;
    a second motor;
    a single motor shaft for receiving output torque from both of said first and second motors;
    a planetary gear unit for transmitting torque between said first motor and said motor shaft;
    means for transmitting said output torques from said motor shaft to at least one drive wheel;
    first sensing means for sensing at least one travelling condition of the vehicle and for generating a travelling condition signal;
    second sensing means for sensing rotational speeds of said first and second motors and for generating rotational speed signals;
    request torque determining means for determining a request torque required for travel of said vehicle in accordance with said signals from said first and second sensing means; and
    output torque distribution determining means for distributing said request torque between said first and second motors, in accordance with said rotational speed signals to control the output torques of said first and second motors.

6. A drive unit for an electric motor vehicle according to claim 5, wherein said first and second motors achieve maximum efficiency in the same operating range.

* * * * *